Figure 3:
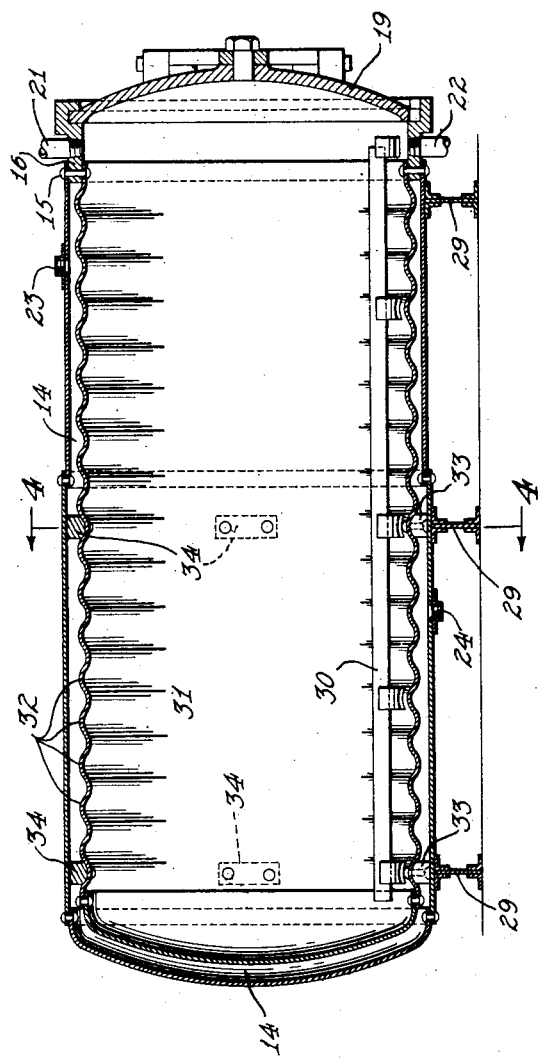

Aug. 20, 1929.  F. G. SHERBONDY  1,724,974
JACKETED HEATER
Filed March 22, 1926   2 Sheets-Sheet 1
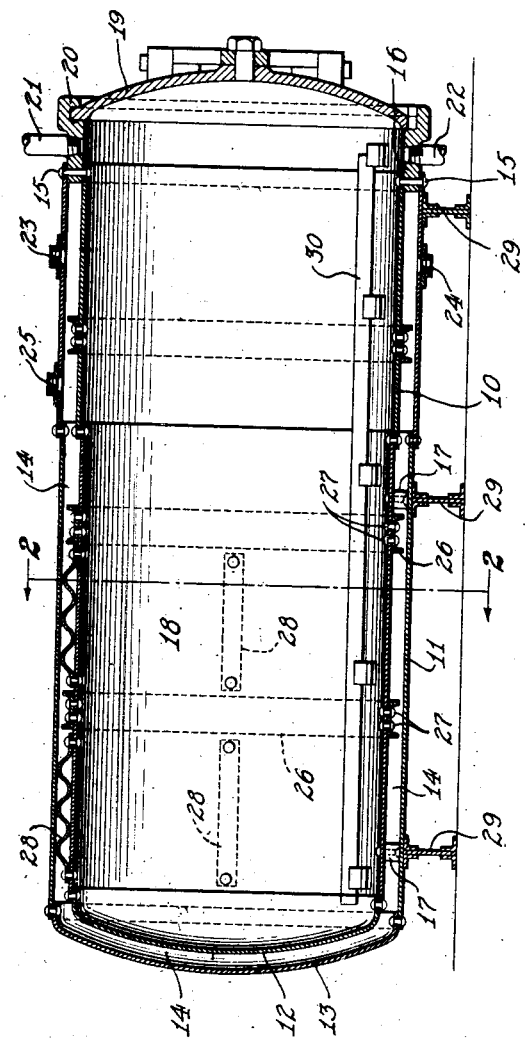
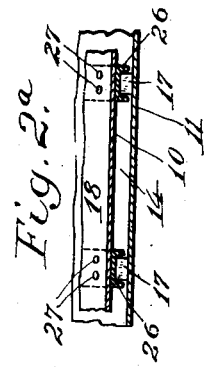
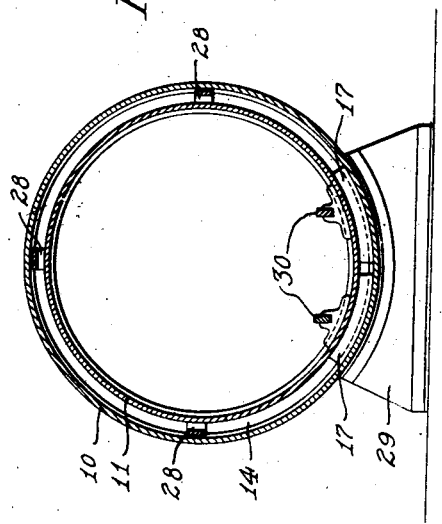
INVENTOR.
Frederick G. Sherbondy
BY
Rogers Kennedy Campbell
ATTORNEYS Aug. 20, 1929.  F. G. SHERBONDY  1,724,974
JACKETED HEATER
Filed March 22, 1926    2 Sheets-Sheet 2

INVENTOR.
Frederick G. Sherbondy
BY
Rogers, Kennedy & Campbell
ATTORNEYS

Patented Aug. 20, 1929.

1,724,974

UNITED STATES PATENT OFFICE.

FREDERICK G. SHERBONDY, OF AKRON, OHIO, ASSIGNOR TO THE BIGGS BOILER WORKS COMPANY, A CORPORATION OF OHIO.

JACKETED HEATER.

Application filed March 22, 1926. Serial No. 96,492.

This invention relates to improvements in heating devices in general and has particular reference to jacketed heaters for use in treating rubber and other articles, as in vulcanizing, impregnating and devulcanizing processes.

Such devices, heretofore, have usually included inner and outer shells assembled together in spaced relationship and rigidly fastened together by stay-bolts and the like. The rigid connection of the two shells in this manner gives rise to many serious objections. For instance, not only are the manufacturing operations expensive and tedious, but in addition the stay-bolts as well as the shells themselves are frequently overstrained or damaged by the tendency of the shells to expand and contract to different extents due to the pressure and temperature differences within the treating chamber and the jacket. By the present invention, these objections are eliminated, and a jacketed heater is produced wherein the two shells can expand and contract with perfect freedom independently of each other, although capable of withstanding the external and internal pressures exerted thereon when the heater is in use, and wherein the weight of the inner shell and its contents is properly transmitted and uniformly distributed to the outer shell.

An important feature of this invention, therefore, in its broader aspects, is to provide a heater of the above-mentioned character including spaced shells capable of independent expansion and contraction.

Another feature is to provide such heater with novel means for reinforcing the inner shell.

Another feature is to provide such heater with suitable means for maintaining the two shells in their proper spaced relationship and for transferring the weight of the inner shall with its contained load to the outer shell and the supporting base.

Another feature is to provide a heater which will be simple in construction, strong and durable in service, economical to manufacture, and a substantial improvement in the art.

Figure 4:
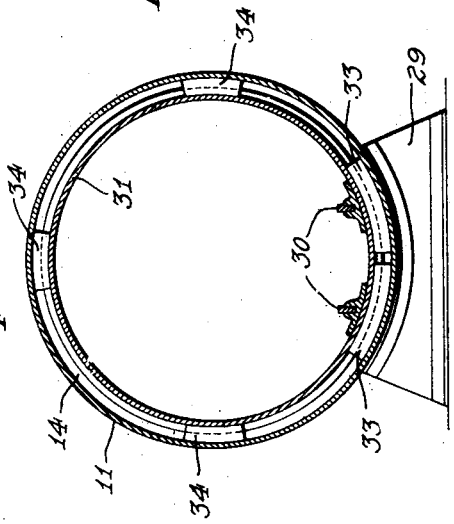

In the drawings forming a part of this application, and wherein similar reference characters designate corresponding parts throughout the several views, Figure 1 is a vertical longitudinal sectional view showing one embodiment of the invention;

Figure 2 is a vertical transverse sectional view on the line 2—2 of Figure 1;

Figure 2ª is an enlarged vertical section showing a detail modification;

Figure 3 is a view similar to Figure 1, illustrating another embodiment of the invention; and Figure 4 is a sectional view on the line 4—4 of Figure 3.

The improved heater illustrated in Figures 1 and 2 is of the horizontal type and includes inner and outer shells 10 and 11 provided with closed ends 12, 13, respectively, the outer shell being spaced from the sides and closed end of the inner shell to form a heating chamber 14. The shells 10 and 11 are secured together adjacent their open ends by rivets 15, or other suitable fastening means, said rivets passing through an annular frame or casing 16 disposed between the open ends of the two shells in such manner as to form a closure for the heating chamber 14. The two shells are thus connected together at one end only, and by so doing, they are capable of a free relative longitudinal movement caused by unequal expansion and contraction when the heater is in use.

The interior of the shell 10 forms a treating chamber 18 to which accesss may be had through a door 19 or other removable closure means of any ordinary or preferred type, said door cooperating with the outer face 20 of the annular casing 16 to seal the treating chamber when in use. An inlet pipe 21 communicates with the treating chamber 18 and through this pipe the treating medium such as steam, hot water, gas or the like, is introduced in carrying out the particular process for which the heater is to be used. The treating medium may be discharged from the chamber 18 through a drain or outlet pipe 22.

A heating medium such as steam is introduced into the heating chamber 14 through a port 23 in the outer shell or jacket 11, and after use is discharged through an exhaust port 24. The temperature within the heating chamber 18 may be easily maintained or controlled as desired, and by way of accessory equipment a safety valve, gauge, or the like may be connected at 25 in communication with the chamber 14.

As the heater is ordinarily used, there is a substantial difference between the pressures within the two chambers 14 and 18, the pressure within the chamber 18 usually being greater than that in the surrounding chamber 14, although the conditions may be reversed according to the process involved. It is therefore necessary to reinforce the inner shell 10 against collapsing or bursting pressure, and for this purpose annular reinforcing members 26 are secured as by rivets 27, to the inner shell 10. These reinforcing members 26 are shown as of channel formation in cross-section, although other structural forms may be used with equal advantage, and extend partly across the space 14 but not far enough to interfere with the circulation of the heating medium. Any number of reinforcing members 26 may be used, dependent upon the proportions of the apparatus, three being shown suitably spaced apart in Figure 1, and if desired, the shell 10 can be further strengthened by the use of supplementary reinforcements 28. The reinforcements 28 are preferably corrugated, and may be in the form of strips spaced around the periphery of the shell 10, as shown, or they may be of circular or cylindrical form to completely or partially surround said shell.

Suitable supports 29 are provided for maintaining the heater in its horizontal position; and to facilitate insertion and removal of goods to be treated, a pair of spaced truck-rails 30 may be mounted in the bottom of the treating chamber.

In order to relieve the rivets 15 of the shearing stresses incident to sagging of the inner shell 10 at its closed end 12, spacing blocks or shims 17 are mounted between the two shells at the underside of the heater and at different points in its length. The blocks 17 thus maintain the two shells in proper spaced relationship, and also transmit the weight of the inner shell 10 and its contents to the outer shell or jacket 11 and its supports 29. The blocks 17 are preferably but not necessarily attached to the outer surface of the shell 10 and have sliding engagement with the inner surface of the jacket 11 so as not to interfere with the free relative movement of these parts due to the unequal expansion and contraction previously mentioned. In Figs. 1 and 2, only two spacing blocks 17 are shown, but if desired (and as indicated in the embodiment illustrated in Figs. 3 and 4) other blocks may be placed at other points around the circumference to relieve the rivets 15 of strain in the handling or shipment of the heater. However, in such case, it is preferred to place the blocks far enough apart to avoid any interference with the circulation of the heating medium through the chamber 14, although the same effect could be produced by making the spacing blocks in the form of rings cored to permit the passage of steam. In the modification illustrated in Fig. 2ª, the spacing blocks 17 are shown as attached to or mounted within the channel-rings 26 (rather than attached directly to the inner shell 10). By this modified arrangement, the load of the inner shell may be better transmitted to the spacing blocks, since the inner shell is stronger and more rigid where the channel-rings are attached, and since these rings act to distribute the whole dead-load weight equally around the entire circumference of the inner shell. As a further modification, when the heater is mounted upon separate supporting stands, it may be desirable to locate the spacing blocks at points directly above said stands (as in Fig. 1) so as in that way to concentrate the weight of the inner shell at those particular points and thus avoid unnecessary strain upon the outer shell. It will be appreciated that the spacing blocks in any location will serve (at least in some degree) to reinforce the inner shell as well as to distribute the load onto the outer shell.

While the invention may be embodied in heating apparatus for use in connection with various well known processes, it is especially adapted for a vulcanizing process using hot water or the like as a curing medium. The goods to be vulcanized are placed within the treating chamber 18, which is sealed by the closure 19, and are then submerged in hot water at a temperature around 300° F. and under a pressure of approximately one hundred and fifty pounds per square inch. At or about the same time, steam at approximately fifty pounds pressure and temperature is admitted to the heating chamber 14 which envelops the shell 10. Obviously, under such conditions, the two shells 10 and 11 will tend to expand and contract unequally in a longitudinal direction, but since they are secured together at one end only as above described, they are free to move relatively to each other and thus permit such expansion and contraction without causing the slightest interference or damage. The rivets 15 are not subjected to excessive strains because the weight of the inner shell and its contents is taken by the spacing blocks 17 and distributed thereby to the outer shell or jacket 11 and the supports 29, as last described. The reinforcing members 26 and 28 provide the necessary strength to withstand the collapsing or bursting pressure to which the shell 10 may be subjected, and this without interfering with the free circulation of steam through the heating space 14 or the relative movement of the inner and outer shells.

In Figs. 3 and 4 another embodiment of the invention is shown, wherein the inner shell 31 is formed with circumferential corrugations 32 to provide the necessary mechanical strength, said shell 31 carrying spacing blocks 33, similar to the blocks 17 in the previously described form, and additional spacing blocks 34 arranged at desirable intervals around the periphery of the shell. The blocks 33 and 34 engage the inner surface of the jacket 11 and are slidable thereon to permit free relative movement of the two shells. In other respects, this second embodiment is so similar to that first described that any further discussion would be superfluous. However, it may be added that the corrugated form of the inner shell 31, in addition to permitting the ready expansion and contraction of the shell, provides a greater radiating surface than does a plain cylindrical shell, which feature is particularly advantageous when water is used as the vulcanizing or treating medium.

From the foregoing it will be evident that a heater has been produced which will be simple in construction, strong and durable in service and an improvement in the art. The invention is susceptible of further modification, and the right is herein reserved to make such changes as fall within the scope of the appended claims without departing from the spirit of the invention. For instance, while the several improvements above described are particularly desirable in connection with heaters of the horizontal type shown, they are equally applicable to heaters of the vertical type as well, and especially when such verticle heaters present conical bottom heads which would allow the weight of the inner shell to be transmitted to the outer shell and still permit of a relative longitudinal movement of the two shells due to expansion and contraction.

Having thus described the invention, what is claimed is:

1. A heater comprising an inner shell forming a treating chamber, a jacket surrounding said shell and spaced therefrom to form a heating space, reinforcing channel-rings surrounding the inner shell and secured thereto within the heating space, means for connecting the inner shell and the jacket together at one end only so as to permit relative longitudinal movement of the shell and jacket due to unequal expansion and contraction, and spacing blocks disposed between the shell and jacket, said spacing blocks being secured to one of said members and having sliding engagement with the other member.

2. A heater comprising an inner shell forming a treating chamber, a jacket surrounding said shell and spaced therefrom to form a continuous heating space, reinforcing channel-rings surrounding the inner shell and secured thereto within the heating space, means for connecting the inner shell and the jacket together at one end only so as to permit relative longitudinal movement of the shell and jacket due to unequal expansion and contraction, and spacing means for distributing the weight of the inner shell to the jacket, said spacing means comprising blocks arranged within the reinforcing channel-rings and having sliding engagement with the inner surface of the jacket.

3. A heater comprising an inner shell forming a treating chamber, a jacket surrounding said shell and spaced therefrom to form a continuous heating space, flanged reinforcing-rings surrounding the inner shell and secured thereto within the heating space, means for connecting the inner shell and the jacket together at one end only so as to permit relative longitudinal movement of the shell and jacket due to unequal expansion and contraction, and spacing members for distributing the weight of the inner shell to the jacket, said spacing members being disposed between the flanges of said reinforcing-rings and having sliding engagement with the inner surface of the jacket.

In testimony whereof, I have affixed my signature hereto.

FREDERICK G. SHERBONDY.